United States Patent
Yoo et al.

(10) Patent No.: US 11,447,647 B2
(45) Date of Patent: Sep. 20, 2022

(54) UV PATTERN FORMING METHOD USING INKJET PRINTING, BEZEL MANUFACTURING METHOD INCLUDING SAME, AND BEZEL MANUFACTURED ACCORDING THERETO

(71) Applicant: LG Chem, Ltd., Seoul (KR)

(72) Inventors: Jaehyun Yoo, Daejeon (KR); Joonhyung Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/337,534

(22) PCT Filed: Aug. 28, 2017

(86) PCT No.: PCT/KR2017/009365
§ 371 (c)(1),
(2) Date: Mar. 28, 2019

(87) PCT Pub. No.: WO2018/105857
PCT Pub. Date: Jun. 14, 2018

(65) Prior Publication Data
US 2020/0031141 A1     Jan. 30, 2020

(30) Foreign Application Priority Data

Dec. 9, 2016 (KR) .................. 10-2016-0167971

(51) Int. Cl.
*B41J 2/01* (2006.01)
*C09D 11/101* (2014.01)
(Continued)

(52) U.S. Cl.
CPC ............ *C09D 11/101* (2013.01); *B22F 1/052* (2022.01); *B41J 2/21* (2013.01); *B41J 11/00214* (2021.01);
(Continued)

(58) Field of Classification Search
None
See application file for complete search history.

(56) References Cited

U.S. PATENT DOCUMENTS

| 7,397,672 | B2 | 7/2008 | Nakata et al. |
| 9,321,928 | B2 | 4/2016 | Toyoda et al. |
| (Continued) | | | |

FOREIGN PATENT DOCUMENTS

| CN | 101226331 A | 7/2008 |
| CN | 104040614 A | 9/2014 |
| (Continued) | | |

OTHER PUBLICATIONS

Toyoda, Naoyuki, Method for Producing Metal Powder, Method for Producing Ultraviolet-Curable Inkjet Composition and Method for Producing Printed Matter, Apr. 14, 2016, Japan, All Pages (Year: 2016).*

(Continued)

*Primary Examiner* — Erica S Lin
*Assistant Examiner* — Tracey M McMillion
(74) *Attorney, Agent, or Firm* — Lerner, David, Littenberg, Krumholz & Mentlik, LLP

(57) ABSTRACT

A method for forming a UV pattern using inkjet printing, which enables to form a hairline or pattern having metallic luster in a single inkjet patterning process, a method for manufacturing a bezel comprising the same, and a bezel manufactured thereby are disclosed. The method for forming a UV pattern using inkjet printing comprises the steps of a) inkjet printing an ultraviolet curable ink containing metal particles in a non-display area of a cover window for a display to form a UV pattern; and b) curing the UV pattern. The bezel can be used in various fields such as a touch panel, a protective film for an optical disc, and the like.

5 Claims, 2 Drawing Sheets

(51) Int. Cl.
  *B41J 2/21* (2006.01)
  *B41M 1/22* (2006.01)
  *B41J 11/00* (2006.01)
  *B22F 1/052* (2022.01)

(52) U.S. Cl.
  CPC ......... *B41M 1/22* (2013.01); *B22F 2301/052* (2013.01); *B22F 2301/10* (2013.01); *B22F 2301/15* (2013.01); *B22F 2301/255* (2013.01); *B22F 2301/35* (2013.01)

(56) References Cited

U.S. PATENT DOCUMENTS

| | | | |
|---|---|---|---|
| 9,963,602 | B2 | 5/2018 | Yoo et al. |
| 2005/0176849 | A1 | 8/2005 | Yang |
| 2008/0286488 | A1 | 11/2008 | Li et al. |
| 2009/0274833 | A1 | 11/2009 | Li et al. |
| 2011/0239886 | A1 | 10/2011 | Holmes |
| 2012/0295076 | A1* | 11/2012 | Toyoda .................. C09D 11/38 428/195.1 |
| 2012/0295082 | A1 | 11/2012 | Toyoda et al. |
| 2013/0335495 | A1* | 12/2013 | Umebayashi ........ B41M 7/0081 347/102 |
| 2014/0342129 | A1 | 11/2014 | Kim et al. |
| 2015/0201491 | A1* | 7/2015 | Tatsuta .................. H05K 3/125 361/748 |
| 2015/0290951 | A1* | 10/2015 | Furuhata .................. D06P 5/00 428/195.1 |
| 2016/0016845 | A1 | 1/2016 | Cho et al. |
| 2016/0066456 | A1* | 3/2016 | Min .......................... G06F 1/16 428/172 |
| 2016/0108263 | A1 | 4/2016 | Yoo et al. |
| 2016/0264794 | A1 | 9/2016 | Takiguchi et al. |
| 2017/0130079 | A1 | 5/2017 | Mizuta et al. |

FOREIGN PATENT DOCUMENTS

| | | | | | |
|---|---|---|---|---|---|
| CN | 105159502 | A | | 12/2015 | |
| CN | 105524526 | A | | 4/2016 | |
| EP | 2862725 | A1 | | 4/2015 | |
| EP | 2902115 | A1 | | 8/2015 | |
| JP | 2004163482 | A | | 6/2004 | |
| JP | 2005223323 | A | | 8/2005 | |
| JP | 2010194462 | A | | 9/2010 | |
| JP | 2012241061 | A | | 12/2012 | |
| JP | 2014067952 | A | | 4/2014 | |
| JP | 2014153544 | A | | 8/2014 | |
| JP | 2014215702 | A | | 11/2014 | |
| JP | 2015009392 | A | | 1/2015 | |
| JP | 2015049364 | A | | 3/2015 | |
| JP | 2015074123 | A | | 4/2015 | |
| JP | 2015074123 | A | * | 4/2015 | ............... B32B 9/00 |
| JP | 2015129943 | A | | 7/2015 | |
| JP | 2015132688 | A | | 7/2015 | |
| JP | 2016169380 | A | | 9/2015 | |
| JP | 2016027120 | A | | 2/2016 | |
| JP | 2016053175 | A | | 4/2016 | |
| KR | 20060052831 | A | | 5/2006 | |
| KR | 100858223 | B1 | | 9/2008 | |
| KR | 20130123000 | A | | 11/2013 | |
| KR | 101380802 | B1 | | 4/2014 | |
| KR | 20150026813 | A | | 3/2015 | |
| KR | 20150042092 | A | | 4/2015 | |
| KR | 20150048209 | A | | 5/2015 | |
| KR | 20150115486 | A | * | 10/2015 | |
| KR | 20150115486 | A | | 10/2015 | |
| KR | 20150126317 | A | | 11/2015 | |
| KR | 20160057331 | A | | 5/2016 | |
| TW | 201235713 | A | | 9/2012 | |
| TW | 201504723 | A | | 2/2015 | |
| TW | 201544557 | A | | 12/2015 | |
| WO | 2012032920 | A1 | | 3/2012 | |
| WO | 2016076662 | A1 | | 5/2016 | |

OTHER PUBLICATIONS

Lee Jin Woong, Touch Window, Oct. 14, 2015, Korea, All Pages (Year: 2015).*
Taiwanese Search Report for TW Application No. 106131922, dated Jul. 10, 2019, 1 page.
International Search Report for PCT/KR2017/009365, dated Nov. 23, 2017.
Taiwanese Search Report for TW Application No. 106131922, dated May 11, 2018.
Chinese Search Report for Application No. 201780065136.2 dated Jun. 23, 2020, 3 pages.

* cited by examiner

[Fig. 1]
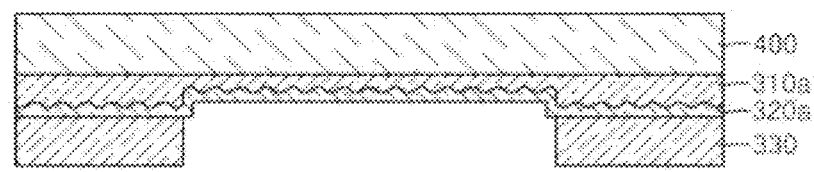
(A)
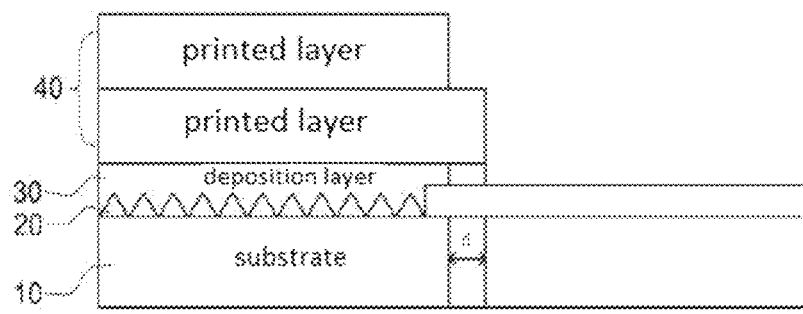
(B)
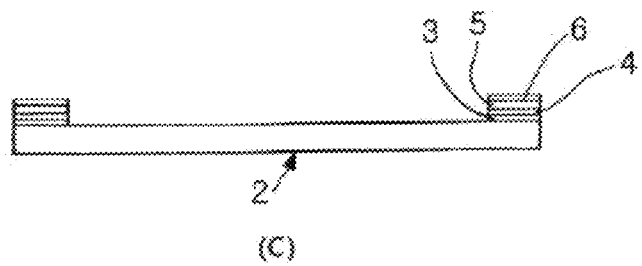
(C)

[Fig. 2]
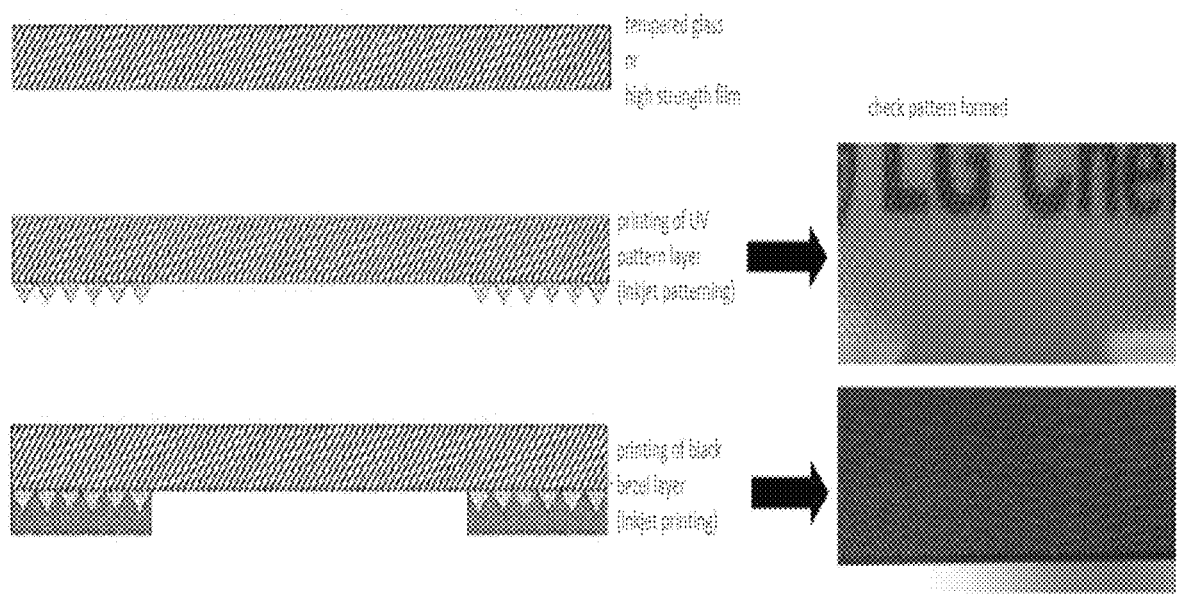
[Fig. 3]
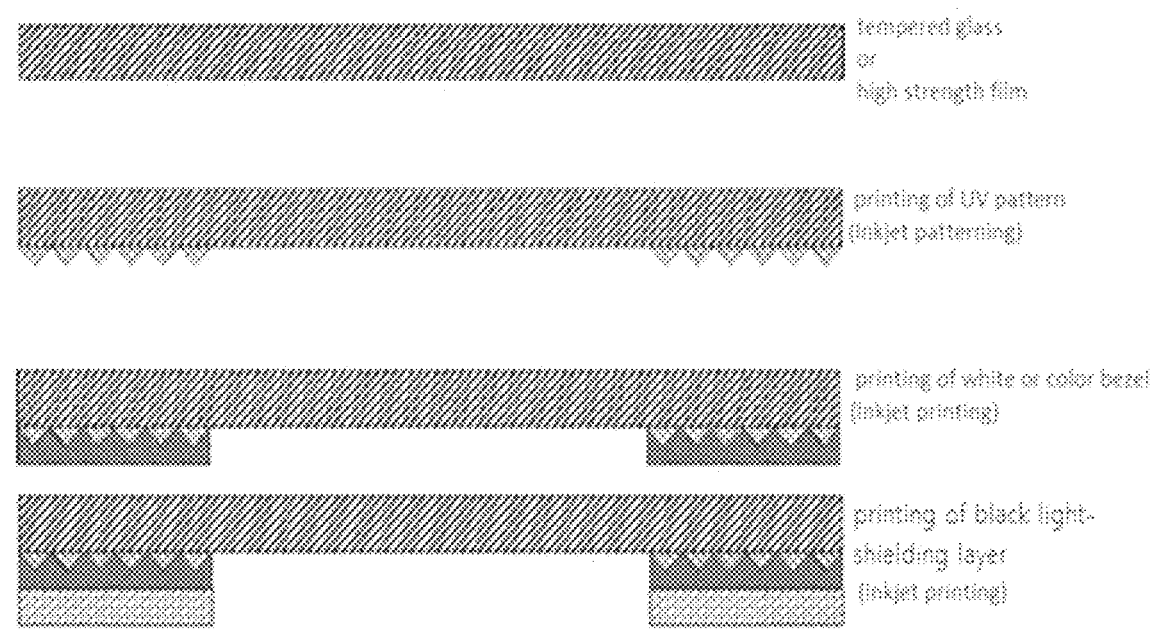

UV PATTERN FORMING METHOD USING INKJET PRINTING, BEZEL MANUFACTURING METHOD INCLUDING SAME, AND BEZEL MANUFACTURED ACCORDING THERETO

CROSS-REFERENCE TO RELATED APPLICATIONS

This application is a national phase entry under 35 U.S.C. § 371 of International Application No. PCT/KR2017/009365, filed Aug. 28, 2017, which claims priority to Korean Patent Application No. 10-2016-0167971, filed Dec. 9, 2016, the disclosures of which are incorporated herein by reference.

FIELD OF THE INVENTION

The present invention relates to a method for forming a UV pattern using inkjet printing, a method for manufacturing a bezel comprising the same, and a bezel manufactured thereby. More specifically, it relate to a method for forming a UV pattern using inkjet printing, which enables to form a hairline or pattern having metallic luster in a single inkjet patterning process, a method for manufacturing a bezel comprising the same, and a bezel manufactured thereby.

BACKGROUND OF THE INVENTION

A bezel, which is a non-display area, exists on the cover window of a display device such as a smart phone or a tablet PC. The bezel is formed with a printed layer of various colors such as black and white for providing a sense of aesthetics. But it has a disadvantage of flat external design. In the prior art, in order to enhance the aesthetic design of the product, a UV pattern layer is formed by a UV molding method, a reflective pattern layer for realizing a metallic feeling is formed on the UV pattern layer by a vapor deposition process, and then a printed layer for realizing colors is formed thereon. Thereby, hairlines and patterns having various designs and metallic luster are formed on the printed layer.

FIG. 1 is a sectional side view of a conventional bezel. Among the prior arts as described above, Korean Patent Laid-Open Publication No. 10-2015-0042092 (WINDOW PANEL, MANUFACTURING METHOD THEREOF, AND DISPLAY APPARATUS INCLUDING THE WINDOW PANEL) discloses that a reflective pattern layer 320a and a UV pattern layer 310a are sequentially laminated on the upper side of a printed layer 330, as shown in FIG. 1(A). Likewise, Korean Patent No. 10-1414081 (HAIRLINE AND PATTERN DESIGN FORMING METHOD OF WINDOWS TYPE ELECTRONIC EQUIPMENT) discloses that a UV pattern layer 20, a vapor deposition layer 30, and a printed layer 40 are sequentially laminated, as shown in FIG. 1(B). Korean Patent No. 10-1380802 (DECORATION GLASS EXPRESSED BY UNEVEN PATTERN OF OPAQUE WINDOW FOR MOBILE COMMUNICATION DEVICE AND MANUFACTURING PROCESS THEREOF) discloses a UV pattern layer 2, a reflective layer 5 and a printed layer 6 are sequentially laminated, as shown in FIG. 1(C).

SUMMARY OF THE INVENTION

As described above, in most of the prior arts, in order to enhance the aesthetic design of the product, a UV pattern layer is formed by a UV molding method, a reflective pattern layer for realizing a metallic feeling is formed on the UV pattern layer by a deposition process, and a printed layer for realizing colors is formed thereon. However, there is a problem in that the process steps are complicated, for example, the UV pattern layer and the reflective pattern layer must be laminated in turn, and the reflective pattern layer which is formed up to the display area by the deposition process must be removed by the etching process.

Therefore, it is an object of the present invention to provide a method for forming a UV pattern using inkjet printing, which enables to form a hairline or pattern having metallic luster in a single inkjet patterning process by adding metal particles serving as a reflective pattern layer into a UV curable ink, a method for manufacturing a bezel comprising the same, and a bezel manufactured thereby.

In order to achieve the above object, the present invention provides a method for forming a UV pattern using inkjet printing, comprising the steps of: a) inkjet printing an ultraviolet curable ink containing metal particles on a non-display area of a cover window for a display to form a UV pattern; and b) curing the UV pattern.

Furthermore, the present invention provides a method for manufacturing a bezel comprising the method for forming a UV pattern using inkjet printing, wherein the method comprises the steps of: a) inkjet printing an ultraviolet curable ink containing metal particles on a non-display area of a cover window for a display to form a UV pattern; b) curing the UV pattern; c) inkjet printing a black ink on the UV pattern to form a black printed layer, or inkjet printing a color ink or a white ink on the UV pattern to form a color/white printed layer and then printing a light-shielding layer thereon, and d) curing the printed layer and the light-shielding layer.

The present invention also provides a bezel which is obtained according to the method for manufacturing the bezel and comprises a cover window for a display; a UV pattern having a thickness of 1 to 10 μm, which is placed on a non-display area of the cover window and has luster by including metal particles; and a black printed layer having a thickness of 2 to 10 μm, or a color/white printed layer having a thickness of 10 to 30 μm with a light-shielding layer having a thickness of 1 to 8 μm formed thereon, which is placed on the UV pattern.

According to the method for forming a UV pattern using inkjet printing according to the present invention, the method for manufacturing a bezel comprising the same, and the bezel manufactured thereby, it is possible to form a hairline or pattern having metallic luster in a single inkjet patterning process by adding metal particles serving as a reflective pattern layer into a UV curable ink.

BRIEF DESCRIPTION OF THE DRAWINGS

FIG. 1 is a sectional side view of a conventional bezel.

FIG. 2 is a schematic view of a process for manufacturing a bezel including a UV pattern and a printed layer formed with a black ink, according to one embodiment of the present invention.

FIG. 3 is a schematic view of a process for manufacturing a bezel including a UV pattern and a printed layer formed with a color or white ink, according to other embodiment of the present invention.

DETAILED DESCRIPTION OF THE INVENTION

The present invention will now be described in detail.

The method for forming a UV pattern using inkjet printing according to the present invention comprises the steps of: a) inkjet printing an ultraviolet curable ink containing metal particles on a non-display area of a cover window for a display to form a UV pattern; and b) curing the UV pattern.

The metal particles, which are contained in the ultraviolet curable ink, are used for imparting metallic luster to the UV pattern formed by the inkjet printing or patterning. The metal particles can be used without limitations as long as they are ordinary metals having luster. Examples thereof include aluminum (Al), silver (Ag), copper (Cu), nickel (Ni), cobalt (Co), iron (Fe), etc. The size of the metal particles is 50 to 1,000 nm, preferably 100 to 800 nm, and more preferably 200 to 500 nm. If the size of the metal particles is less than 50 nm, the reflection effect may be deteriorated, and the UV pattern may not be visually recognized. If the size of the metal particles exceeds 1,000 nm, the nozzle of the inkjet head may be clogged and the performance of process may be deteriorated.

The content of the metal particles is 1 to 10% by weight, preferably 1 to 5% by weight, and more preferably 1 to 3% by weight based on the total weight of the ultraviolet curable ink. If the content of the metal particles is less than 1% by weight based on the total weight of the ultraviolet curable ink, the UV pattern may not be visually recognized, thereby forming a thicker UV pattern. If the content of the metal particles exceeds 10% by weight based on the total weight of the ultraviolet curable ink, the color of the printed layer of bezel cannot be expressed due to excessive reflection of light.

The UV pattern refers to a pattern formed at the edges of various devices such as a display device. The UV pattern may be formed on the cover window to a thickness of 1 to 10 μm, preferably 2 to 8 μm, and more preferably 3 to 6 μm. In addition, the UV pattern may be formed in various shapes such as a check line shape, a diamond shape, as well as a hairline.

The ultraviolet curable ink is a cationic polymerizable UV curable ink including a dispersant, an epoxy resin, a vinyl ether compound, an oxetane resin, a photopolymerization initiator, an adhesion promoter, a photosensitizer and a surfactant in addition to the metal particles, or a radical polymerizable UV curable ink including a dispersant, an acrylate oligomer, an acrylate monomer, a photopolymerization initiator, an adhesion promoter and a surfactant in addition to the metal particles. A detailed description thereof will be given in Korean Patent Application No. 10-2016-0130523 (INFRARED RAY TRANSMITTANCE INK COMPOSITION FOR INKJET, METHOD FOR PREPARING A BEZEL PATTERN USING THE SAME, THE BEZEL PATTERN USING THE SAME METHOD AND DISPLAY PANEL COMPRISING THE BEZEL PATTERN) and Korean Patent Application No. 10-2016-0043445 (METHOD FOR FORMING A BEZEL PATTERN USING INKJET PRINTING).

A dose for curing the ultraviolet curable ink may be 20 to 20,000 mJ/cm$^2$ and preferably 50 to 3000 mJ/cm$^2$, and the ultraviolet curable ink may be cured by absorbing ultraviolet rays in a wavelength range of 250 to 410 nm. The viscosity is 1 to 50 cP at 25° C., but is not limited thereto. Further, the inkjet printing is not particularly limited as long as it is performed by means that enables the formation of a UV pattern. Examples of the cover window (or substrate) include a glass such as a tempered glass, a film such as a high strength film, and the like. The non-display area of the cover window means the remaining portion except for the display part where the screen is displayed.

The light source for curing the ultraviolet curable ink may be used without any particular limitations as long as it emits light having a wavelength ranging from 250 to 410 nm corresponding to ultraviolet rays. Examples of the light source include a UV lamp, a mercury vapor arc lamp, a carbon arc lamp, a Xe arc lamp and a LED curing machine. The curing of the UV pattern in the step b) is preferably performed by ultraviolet irradiation, but may be performed by other means capable of curing the UV pattern.

As described above, by using the method for forming a UV pattern using inkjet printing according to the present invention, the metal particles included in the ink serve as a reflective pattern layer so that a pattern having a shape such as a hairline, a check line and a diamond and the like which has a metallic luster is formed by a single inkjet patterning process. Therefore, it is possible to avoid the trouble of removing the reflective pattern layer by etching process after sequential lamination of the UV pattern layer and the reflective pattern layer.

Next, a method for manufacturing a bezel comprising the method for forming a UV pattern will be described. FIG. 2 is a schematic view of a process for manufacturing a bezel including a UV pattern and a printed layer formed with a black ink, according to one embodiment of the present invention. FIG. 3 is a schematic view of a process for manufacturing a bezel including a UV pattern and a printed layer formed with a color or white ink, according to other embodiment of the present invention.

Referring to FIGS. 2 and 3, a method for manufacturing a bezel will be described. The method for manufacturing a bezel comprises the steps of: a) inkjet printing an ultraviolet curable ink containing metal particles on a non-display area of a cover window for a display to form a UV pattern; b) curing the UV pattern; c) inkjet printing a black ink on the UV pattern to form a black printed layer, or inkjet printing a color ink or a white ink on the UV pattern to form a color/white printed layer and then printing a light-shielding layer thereon; and d) curing the printed layer and the light-shielding layer.

The size of the metal particles is 50 to 1,000 nm, preferably 100 to 800 nm, and more preferably 200 to 500 nm. If the size of the metal particles is less than 50 nm, the reflection effect may be deteriorated, and the UV pattern may not be visually recognized. If the size of the metal particles exceeds 1,000 nm, the nozzle of the inkjet head may be clogged and the performance of process may be deteriorated.

The steps a) and b) are the same as those described in the method for forming a UV pattern using inkjet printing. In the step c), the printed layer can be formed differently according to the color of the target bezel. The black printed layer may be formed by using only black ink. Alternatively, firstly a color printed layer or a white printed layer may be formed, and then a light-shielding layer may be formed thereon. Further, the inkjet printing in the step c) is not particularly limited as long as it is performed by means that enables the formation of the printed layer of the bezel.

When a black printed layer is formed on the UV pattern, the thickness is 2 to 10 μm, preferably 4 to 8 μm, and more preferably 4 to 6 μm. When a color/white printed layer is formed on the UV pattern, the thickness is 10 to 30 μm, preferably 15 to 25 μm, and more preferably 20 to 25 μm. The thickness of the light-shielding layer formed on the color/white printed layer is 1 to 8 μm, preferably 2 to 6 μm, and more preferably 3 to 5 μm.

The black ink, the color ink, the white ink and the light-shielding layer may be a cationic polymerizable UV curable ink including a pigment, a dispersant, an epoxy resin, a vinyl ether compound, an oxetane resin, a photopolymerization initiator, an adhesion promoter, a photosensitizer and a surfactant, etc., or a radical polymerizable UV curable ink including a pigment, a dispersant, an acrylate oligomer, an acrylate monomer, a photopolymerization initiator, an adhesion promoter and a surfactant, etc.

A dose for curing the ink and the light-shielding layer may be 20 to 20,000 mJ/cm$^2$ and preferably 50 to 3000 mJ/cm$^2$, and the ink and the light-shielding layer may be cured by absorbing ultraviolet rays in a wavelength range of 250 to 410 nm. The viscosity is 1 to 50 cP at 25° C., but is not limited thereto. The light source in the case where the ink and the light-shielding layer are UV cured can be used without any particular limitations as long as it emits light having a wavelength of 250 to 410 nm corresponding to ultraviolet rays. Examples of the light source include a UV lamp, a mercury vapor lamp, a carbon arc lamp, a Xe arc lamp and a LED curing machine. The curing of the printed layer and the light-shielding layer in the step d) is performed by ultraviolet irradiation, but may be performed by other means capable of curing the printed layer and the light-shielding layer, such as radiation other than ultraviolet rays. The non-display area of the cover window means the remaining portion except for the display part where the screen is displayed.

In addition, the black printed layer and the color/white printed layer are excellent in light-shielding property, adhesion force and surface hardness, and have a light-shielding property of 4 or more as an optical density and adhesion force of 4 B or more in the cross cut test, which is required as the performance of the bezel. Meanwhile, the fundamental method for manufacturing a bezel which is not described corresponds to an ordinary method for manufacturing a bezel.

The present invention provides a bezel which is obtained according to the method for manufacturing the bezel and comprises a cover window for a display, a UV pattern having a thickness of 1 to 10 μm, which is placed on a non-display area of the cover window, and a black printed layer having a thickness of 2 to 10 μm, or a color/white printed layer having a thickness of 10 to 30 μm with a light-shielding layer having a thickness of 1 to 8 μm formed thereon, which is placed on the UV pattern.

The size of the metal particles is 50 to 1,000 nm, preferably 100 to 800 nm, and more preferably 200 to 500 nm. If the size of the metal particles is less than 50 nm, the reflection effect may be deteriorated, and the UV pattern may not be visually recognized. If the size of the metal particles exceeds 1,000 nm, the nozzle of the inkjet head may be clogged and the performance of process may be deteriorated.

The description of the components of the bezel corresponds to the above-described method for forming the UV pattern and the method for manufacturing the bezel.

Hereinafter, preferred embodiments of the present invention will be described in order to facilitate understanding of the present invention. However, the following examples are provided for illustrative purposes only, and it will be apparent to those skilled in the art that various modifications and variations can be made in the present invention without departing from the spirit or scope of the inventions. Such changes and modifications are intended to fall within the scope of the appended claims.

EXAMPLE 1

Manufacturing of Bezel Using UV Pattern Containing Metal Particles

An ultraviolet curable ink containing 2 wt % of a large number of aluminum (Al) particles having a size of 500 nm, 15 wt % of an epoxy resin (ceI2021P), 57 wt % of an oxetane resin (OXT-221), 15 wt % of a vinyl ether compound (1,4-cyclohexanedimethanol divinyl ether), 4 wt % of a photopolymerization initiator (Irgacure 250), 1 wt % of a photosensitizer (ITX), 5 wt % of an adhesion promoter (KBM-403) and 1 wt % of an additive containing a surfactant (BYK-307) was inkjet printed on a non-display area of a cover window for a display to form a UV pattern having a thickness of 4 μm. Then, the resulting UV pattern was cured with a 395 nm UV LED lamp at an energy of 500 mJ/cm$^2$ to form the UV pattern containing metal particles. Subsequently, a black printed layer having a thickness of 5 μm was formed by inkjet printing of a black ink on the UV pattern, and then cured at an energy of 5,000 mJ/cm$^2$ using a 395 nm UV LED lamp to produce a bezel.

EXAMPLE 2

Manufacturing of Bezel Using UV Pattern Containing Metal Particles

A bezel was produced in the same manner as in Example 1, except that 2 wt % of silver (Ag) particles having a size of 500 nm was used as the metal particles and a black printed layer having a thickness of 6 μm was formed on the UV pattern.

EXAMPLE 3

Manufacturing of Bezel Using UV Pattern Containing Metal Particles

A bezel was produced in the same manner as in Example 1, except that a color ink was inkjet printed on the UV pattern to form a white printed layer having a thickness of 25 μm and was UV cured, and then a black light-shielding layer having a thickness of 4 μm was printed thereon.

COMPARATIVE EXAMPLE 1

Manufacturing of Bezel with UV Pattern Layer and Reflective Pattern Layer

A UV pattern layer, which is formed on a conventional bezel, was formed on a display substrate by UV molding method. A reflective pattern layer for realizing a metallic feeling was formed thereon by a vapor deposition process. Then, after forming a printed layer, the reflective pattern layer formed on the display area was removed through an etching process to produce a bezel.

Evaluation of Metallic Luster of the Bezel According to Examples 1 to 3 and Comparative Example 1

From a result of evaluating the metallic luster of the bezel produced from Examples 1 to 3 and Comparative Example 1 (examined whether the UV pattern was clearly observed visually), it was found that the bezels of Examples 1 to 3 had a metallic luster similar to that of the bezel of Comparative Example 1. Therefore, it can be seen that even in a single inkjet patterning process according to the present invention, the metallic luster of the bezel can be expressed in the same manner as the existing method having a plurality of processes.

What is claimed is:

1. A method for forming a UV pattern using inkjet printing, consisting of:
   a) a single pass of inkjet printing of an ultraviolet curable ink containing metal particles having a particle size of 200 nm to 500 nm on a non-display area of a cover window for a display of a smart phone or a tablet PC to form the UV pattern; and
   b) curing the UV pattern,
   wherein the metal particles are contained in a content of 1 to 10% by weight based on a total weight of the ultraviolet curable ink to impart metallic luster to the UV pattern,
   wherein the metal particles are selected from the group consisting of aluminum (Al), silver (Ag), copper (Cu), nickel (Ni), cobalt (Co) and iron (Fe), and
   wherein the curing of the UV pattern is performed by ultraviolet irradiation.

2. The method for forming a UV pattern using inkjet printing according to claim 1, wherein a thickness of the UV pattern is 1 to 10 µm.

3. The method for forming a UV pattern using inkjet printing according to claim 1, wherein the UV pattern has a shape selected from the group consisting of a hairline, a check line shape and a diamond shape.

4. The method for forming a UV pattern using inkjet printing according to claim 1, wherein the cover window is a glass or a film.

5. The method for forming a UV pattern using inkjet printing according to claim 1, wherein the non-display area of the cover window is a remaining portion except for a display part where a screen is displayed.

* * * * *